(12) United States Patent
Habboub

(10) Patent No.: US 8,976,196 B1
(45) Date of Patent: Mar. 10, 2015

(54) SYSTEM, DEVICE, AND METHOD FOR GENERATING AND PRESENTING SEPARATE IMAGES ON DUAL-VIEW AIRCRAFT DISPLAY UNIT FOR TWO SEPARATELY-LOCATED VIEWERS

(75) Inventor: Bassel Habboub, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 408 days.

(21) Appl. No.: 13/459,201

(22) Filed: Apr. 29, 2012

(51) Int. Cl.
*G09G 5/00* (2006.01)
*H04N 13/04* (2006.01)

(52) U.S. Cl.
USPC ............................................. 345/629; 348/59

(58) Field of Classification Search
None
See application file for complete search history.

(56) References Cited

U.S. PATENT DOCUMENTS

| 6,133,892 | A  | * | 10/2000 | Borgwardt ................. 345/1.3 |
| 7,974,494 | B2 | * | 7/2011  | Kawamura et al. ........... 382/284 |
| 8,471,893 | B2 | * | 6/2013  | Kim et al. ................... 348/42 |

* cited by examiner

*Primary Examiner* — Ryan R Yang
(74) *Attorney, Agent, or Firm* — Angel N. Gerdzhikov; Donna P. Suchy; Daniel M. Barbieri

(57) ABSTRACT

Novel and non-trivial system, device, and method for generating and presenting different images to separate viewers of a dual-view aircraft display unit are disclosed. An image generator is configured to receive first and second sets of image data, generate third image data from both sets, and provide the third image data to a dual-view aircraft display unit configured to present a left image to a left viewer and a right image to a right viewer. The first and second sets of image data are representative of first and second images, respectively, and comprised of first and second pixel columns, respectively. The third image data is representative of a left image and a right image and, if the images are not shared, comprised of first pixel columns interleaved with second pixel columns. The left or right viewer may change his or her own image without affecting the other's image.

23 Claims, 15 Drawing Sheets

SYSTEM, DEVICE, AND METHOD FOR GENERATING AND PRESENTING SEPARATE IMAGES ON DUAL-VIEW AIRCRAFT DISPLAY UNIT FOR TWO SEPARATELY-LOCATED VIEWERS

BACKGROUND OF THE INVENTION

1. Field of the Invention

This invention pertains generally to the field of aircraft display units that provide information to the pilot(s) or flight crew of an aircraft.

2. Description of the Related Art

The layout of many aircraft cockpits are designed so that the pilot and the co-pilot each have at least one single-view display unit located in front of them. In many cockpit layouts, one or more single-view display units may be located in between them so that both can view the same image presented thereon. In such a configuration, each may have the ability to select and/or interact with the image that will be presented by the single-view display unit(s).

Although each pilot may have the ability to select and/or interact the image that is presented on the single-view display unit, the other pilot is obliged to view the image that has been selected. If both pilots wish to view and/or interact with the two separate images simultaneously, this is not possible with a single-view aircraft display unit.

BRIEF SUMMARY OF THE INVENTION

The embodiments disclosed herein present a system, device, and method for generating and presenting different images to separate viewers of a dual-view aircraft display unit. By generating different images, one viewer may view and interact with an image selected by him or her while the other viewer may view and interact with his or her selection simultaneously on the same display unit.

In one embodiment, a system is disclosed for generating different images to separate viewers of a dual-view aircraft display unit. The system may be comprised of a first source configured to generate first image data, a second source configured to generated second image data, an image generator ("IG") configured to generate third image data, and a dual-view display unit configured to receive the third image data and present one image to a pilot and another image to the co-pilot simultaneously.

In another embodiment, a device is disclosed for generating different images to separate viewers of a dual-view aircraft display unit. This device may be comprised of the IG configured to generate third image data from first image data and second image data.

In another embodiment, a method is disclosed for generating different images to separate viewers of a dual-view aircraft display unit, where the method could be performed by the IG. When properly configured, the IG may receive the first image data, the second image data, generate third image data from the first image data and the second image data, and provide the third image data to a dual-view display unit. As embodied herein, the first image data may be representative of a first image generated as a function of a first image configuration and comprised of first pixel columns, the second image data may be representative of a second image generated as a function of a second image configuration and comprised of second pixel columns, and the third image data may be representative of a left image and a right image and comprised of first pixel columns of the first image interleaved with second pixel columns of the second image.

BRIEF DESCRIPTION OF THE DRAWINGS

FIG. 4A illustrates the left and right images of a first image comprised of contiguous pixel columns presented on a single-view aircraft display unit ("SVADU").

FIG. 4B illustrates the left and right images of a first image comprised of non-contiguous pixel columns presented on an SVADU.

FIG. 4D illustrates the left and right images of a second image comprised of non-contiguous pixel columns presented on an SVADU.

FIG. 4E illustrates the left and right images of a third image comprised of interleaved pixel columns of the first and second images presented on an SVADU.

FIG. 5A illustrates the left and right images of a first image comprised of contiguous pixel columns presented on a dual-view aircraft display unit ("DVADU").

FIG. 5E illustrates the left and right images of a third image comprised of interleaved pixel columns of the first and second images presented on a DVADU.

FIG. 5F illustrates the left and right images of a third image comprised of interleaved pixel columns of the first image presented on a DVADU.

FIG. 5G illustrates the left and right images of a third image comprised of interleaved pixel columns of the second image presented on a DVADU.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
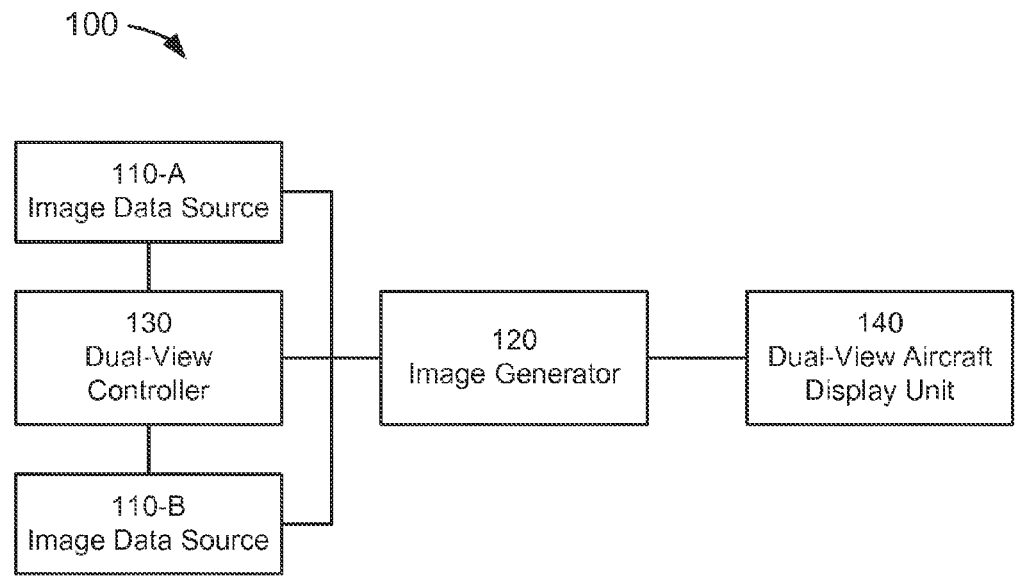
FIG. 1 depicts a block diagram of a dual-view aircraft display unit generation and presentation system.

FIG. 1 depicts a block diagram of a dual-view aircraft display unit generation and presentation system (collectively, "presentation system") 100 suitable for implementation of the techniques described herein. The presentation system 100 of an embodiment of FIG. 1 includes a plurality of image data sources 110, an image generator ("IG") 120, a dual-view controller ("DVC") 130, and a dual-view aircraft display unit ("DVADU") 140.

In an embodiment of FIG. 1, the plurality of image data sources 110 (singularly, 110-A and 110-B) could comprise any system(s) or component(s) thereof from which data representative of an image is generated and displayable on any display unit, where the display unit could include a single-view aircraft display unit ("SVADU") and/or the DVADU. As embodied herein, each data source of the plurality of image data sources 110 could be the same data source; moreover, each data source could be the IG 120. In addition, the plurality of image data sources 110 may provide image data to the IG 120.

Figures 2A, 2B:
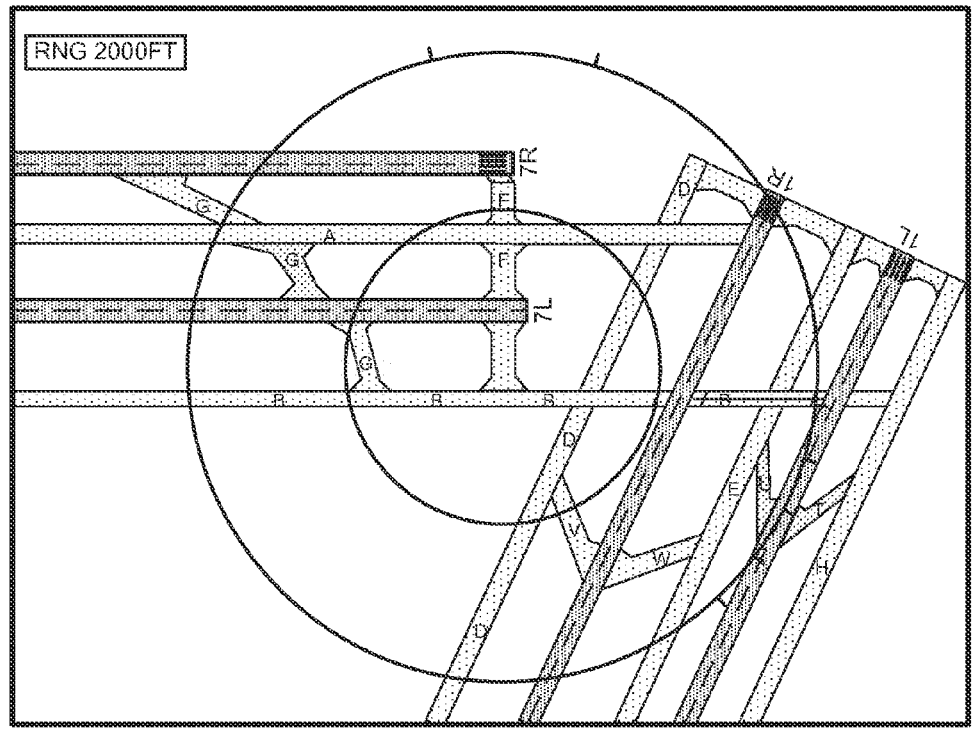
FIG. 2A depicts a first exemplary image configuration.
FIG. 2B depicts a first exemplary image configuration.

Each image could be generated from one or multiple inputs from one or multiple systems or component thereof. Those skilled in the art understand that the format of each image is configurable by a manufacturer and/or end user. FIGS. 2A and 2B illustrate two out of many possible images that may be generated from multiple inputs for display on the same or different display units and may be based upon configurations predetermined by a manufacturer and/or end user.

Referring to FIG. 2A, the selected configuration consists of an image of three windows generated from data provided by multiple inputs. In the upper left-hand window illustrating a "BEFORE STARTING" checklist, those skilled in the art recognize that inputs from multiple systems such as a fuel system, a flight management system ("FMS"), a navigation system, a hydraulics system, an engine system, and/or a lighting system could have been used in the generation of the image data representative of the visual information; in the lower left-hand window illustrating a "FUEL MGMT" panel, inputs from multiple systems such as the fuel system, FMS, the navigation system, and the engine system could have been used; and in the right-hand window illustrating the "SQUAT TWO DEPARTURE" of RIL, input(s) from the FMS only could have been used. Referring to FIG. 2B, the selected configuration consists of an image of an airport surface map generated from data received from a database comprised of airport surface information.

Returning to FIG. 1, the IG 120 and the DVC 130 may be any electronic data processing unit which executes software or computer instruction code that could be stored, permanently or temporarily, in a digital memory storage device or computer-readable media. The IG 120 and the DVC 130 may be driven by the execution of software or computer instruction code containing algorithms developed for the specific functions embodied herein. The IG 120 and the DVC 130 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the processor could also consist of more than one electronic data processing unit. The IG 120 and/or the DVC 130 could be a processor(s) used by or in conjunction with any other system of the aircraft including, but not limited to, plurality of image data sources 110, the DVADU 140, or any combination thereof.

The IG 120 may be programmed or configured to receive as input data representative of information obtained from various systems and/or sources including, but not limited to, the plurality of image data sources 110 and the IG 120. The DVC 130 may be programmed or configured to receive input data representative of information obtained from various systems and/or sources including, but not limited to, a viewer input device that could comprise any source for facilitating a viewer's interaction with graphical user interfaces ("GUI") referred to as widgets that are displayed on the surface of the DVADU 140. The viewer input device may include any device that allows for the manual selection of widgets and/or entry of data. Such devices could include, but are not limited to, a tactile device (e.g., keyboard, control display unit, cursor control device, touch screen device, etc. . . . ) and/or speech recognition systems. Although not indicated in FIG. 1, the DVADU 140 could be included as a viewer input device if it is able to receive viewer input (e.g., touch screen display). As embodied herein, the viewer input device may provide input representative of a viewer's selection to one or both of the plurality of image data sources 110.

As embodied herein, the terms "programmed" and "configured" are synonymous. The IG 120 and/or the DVC 130 may be electronically coupled to systems and/or sources to facilitate the receipt of input data. As embodied herein, operatively coupled may be considered as interchangeable with electronically coupled. It is not necessary that a direct connection is made; instead, such receipt of input data and the providing of output data could be provided through a data bus or through a wireless network. The IG 120 and/or the DVC 130 may be programmed or configured to execute one or both of the methods discussed in detail below. The IG 120 may be programmed or configured to provide image data to various systems and/or units including, but not limited to, the DVADU 140; also, the DVC 130 may be programmed or configured to provide viewer selection data to various systems and/or units including, but not limited to, one or both of the plurality of image data sources 110 and/or the IG 120.

As embodied herein, the terms "programmed" and "configured" are synonymous with respect to the execution of software or source code developed for the specific functions and methods embodied herein. The IG 120 and/or the DVC 130 may be electronically coupled to systems and/or sources to facilitate the receipt of data; as embodied herein, operatively coupled may be considered as interchangeable with electronically coupled. It is not necessary that a direct connection is made; instead, such receipt of input data and the providing of output data could be provided through a data bus or through a wireless network.

In an embodiment of FIG. 1, the DVADU 140 may be comprised of any unit configured to present multiple views to multiple viewers. As disclosed below, the multiple views may be comprised of a left view presented to a viewer located to the left ("left viewer") of the DVADU 140 and right view presented to a viewer located to the right ("right viewer"). For example, the image of FIG. 2A could be presented as a left image to the left viewer and the image of FIG. 2B could be presented as a right image to the right viewer. For the purpose of illustration only, the images of FIGS. 2A and 2B will be represented as a plurality of number 1s and a plurality of number 2s, respectively, in FIGS. 4A through 5E.

As embodied herein, the DVADU 140 could be one of a plurality of display units configured to display dual views. In one embodiment, the DVADU 140 could be comprised of a liquid crystal display unit employing a light-passing mask configured to divide an image into two images, thereby presenting left and right images to left and right viewers. In another embodiment, the DVADU 140 could be comprised of a display unit employing an array of micro-lenses configured to divide an image into left and right images.

Figure 3:
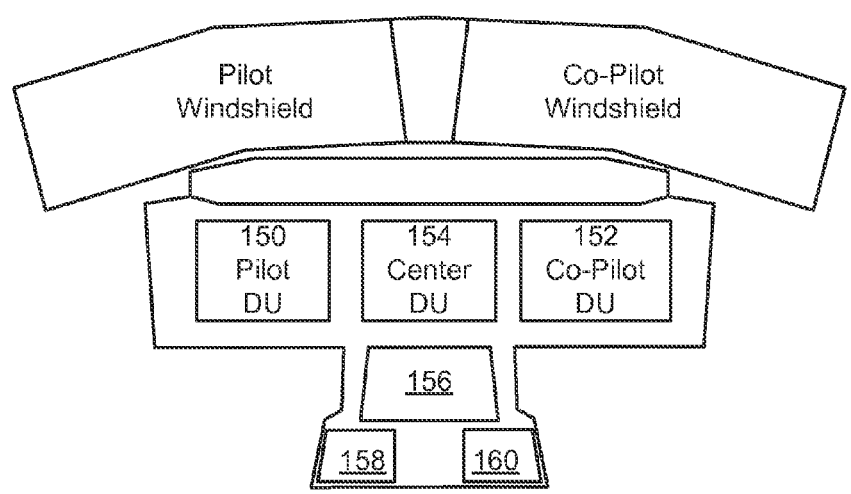
FIG. 3 depicts an exemplary cockpit layout of display units.

In an embodiment of FIG. 3, the DVADU 140 could be employed in a cockpit layout in which a single display unit is shared by more than one pilot. The cockpit layout of FIG. 3 is configured with six head-down display units: a pilot display unit 150 is located directly in front of the pilot, a co-pilot display unit 152 is located directly in front of the co-pilot, a center display unit 154 located in front of and in between the pilot and co-pilot, a center display unit 156 located to the right side of the pilot and the left side of the co-pilot, the pilot's center display 158, and the co-pilot's center display 160. For the purpose of illustration and not of limitation, the DVADU 140 could be comprised of either or both center display units 154 and 156.

Figure 4A:
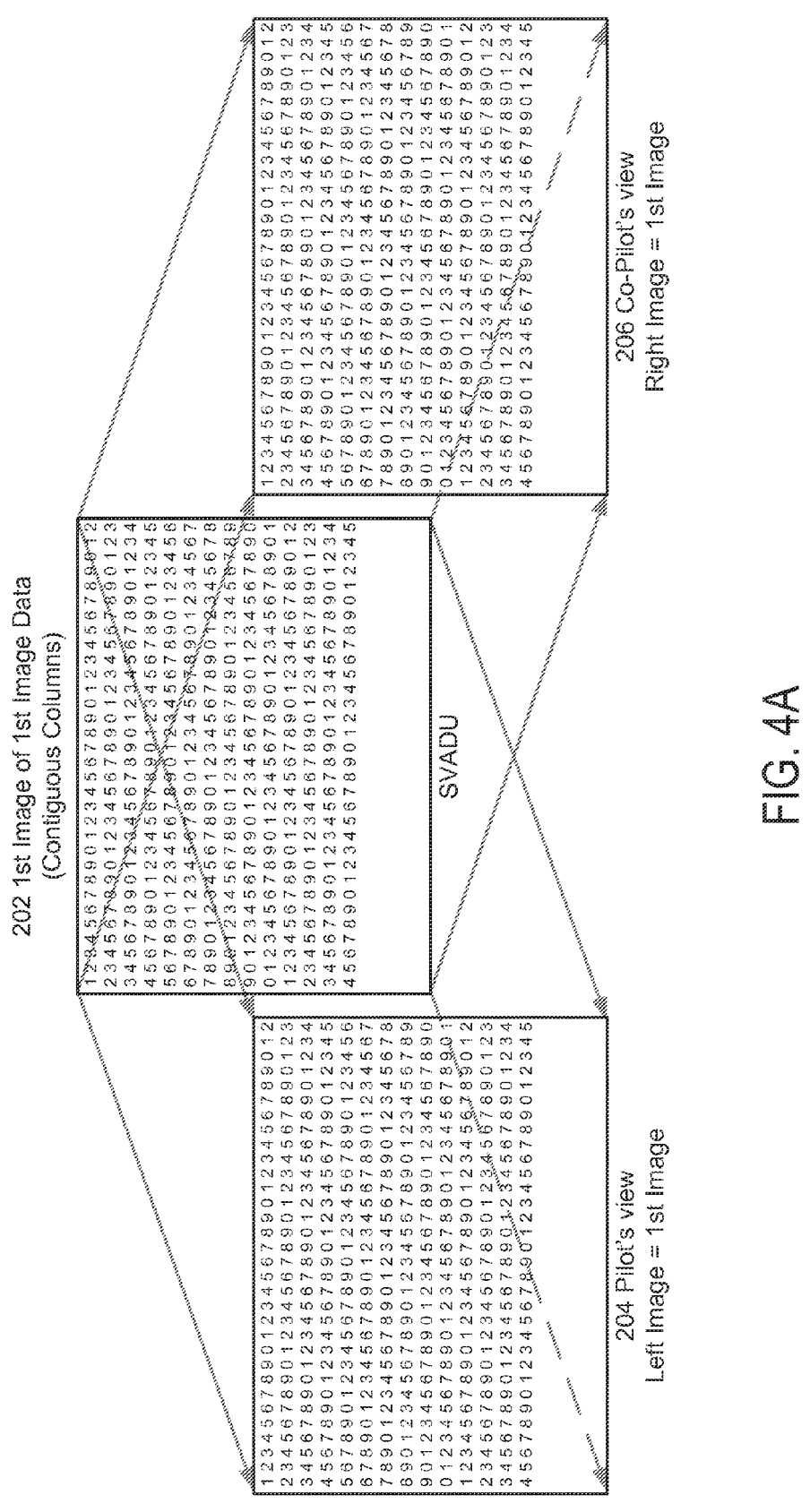
Figure 4B:
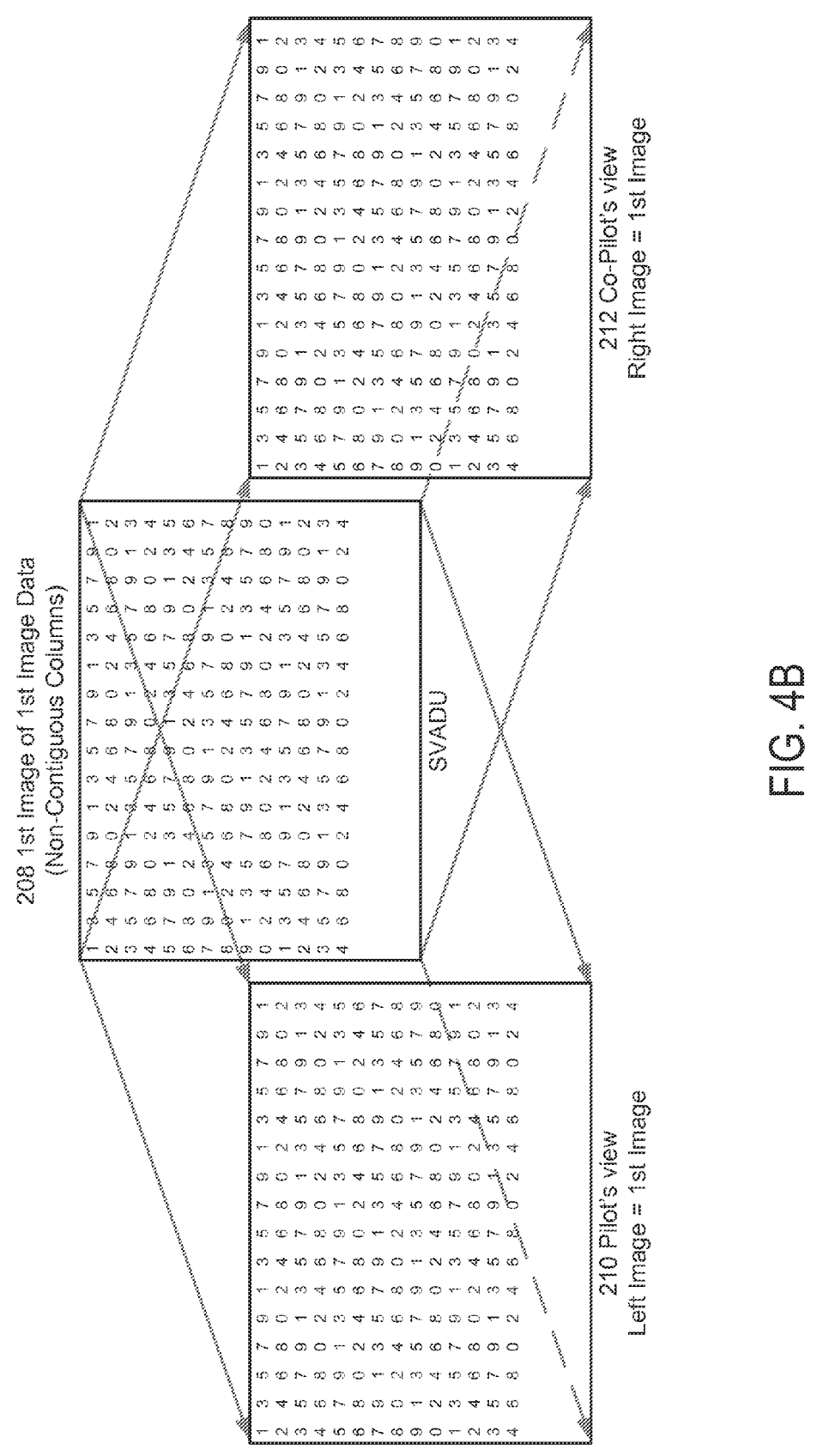
Figure 4C:
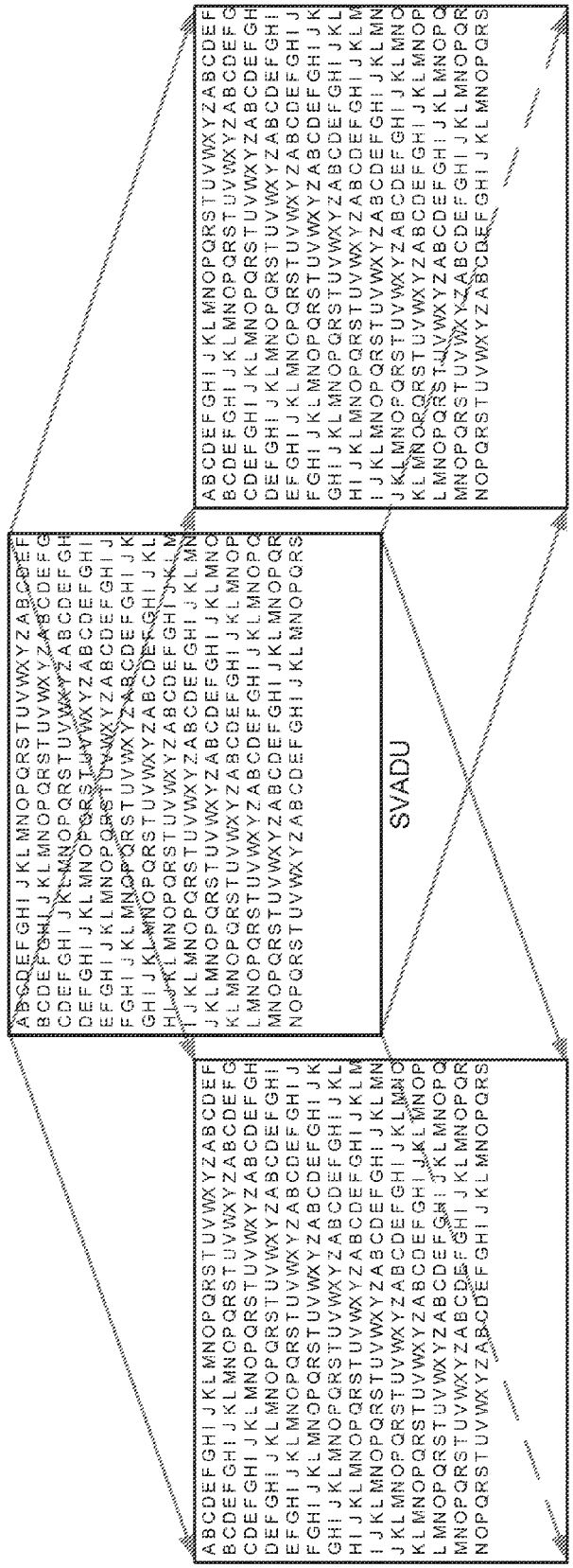
FIG. 4C illustrates the left and right images of a second image comprised of contiguous pixel columns presented on an SVADU.

The advantages and benefits of the embodiments discussed herein may be illustrated by comparing images viewed by the pilot and co-pilot on a SVADU and contrasting them with the images viewed by the pilot and co-pilot on the DVADU 140. The embodiments of FIGS. 4A through 4E illustrate first and second images presented on a SVADU. Referring to FIG. 4A, a first image represented in first image data 202 is comprised of contiguous pixel columns, where the first image data could have been generated by the first image data source 110-A. As shown, the left image of the pilot's view 204 and the right image of the co-pilot's view 206 are the same as the first image represented in first image data 202.

Referring to FIG. 4B, a first image represented in first image data 208 is comprised of non-contiguous pixel columns. As discussed herein, non-contiguous pixel columns of the first image could be comprised of every other pixel column (e.g., odd-numbered pixel columns). As shown, the left image of the pilot's view 210 and the right image of the co-pilot's view 212 are the same as the first image represented in first image data 208.

Referring to FIG. 4C, a second image represented in second image data 214 is comprised of contiguous pixel columns, where the second image data could have been generated by the second image data source 110-B. As shown, the left image of the pilot's view 216 and the right image of the co-pilot's view 218 are the same as the second image represented in second image data 214.

Figure 4D:
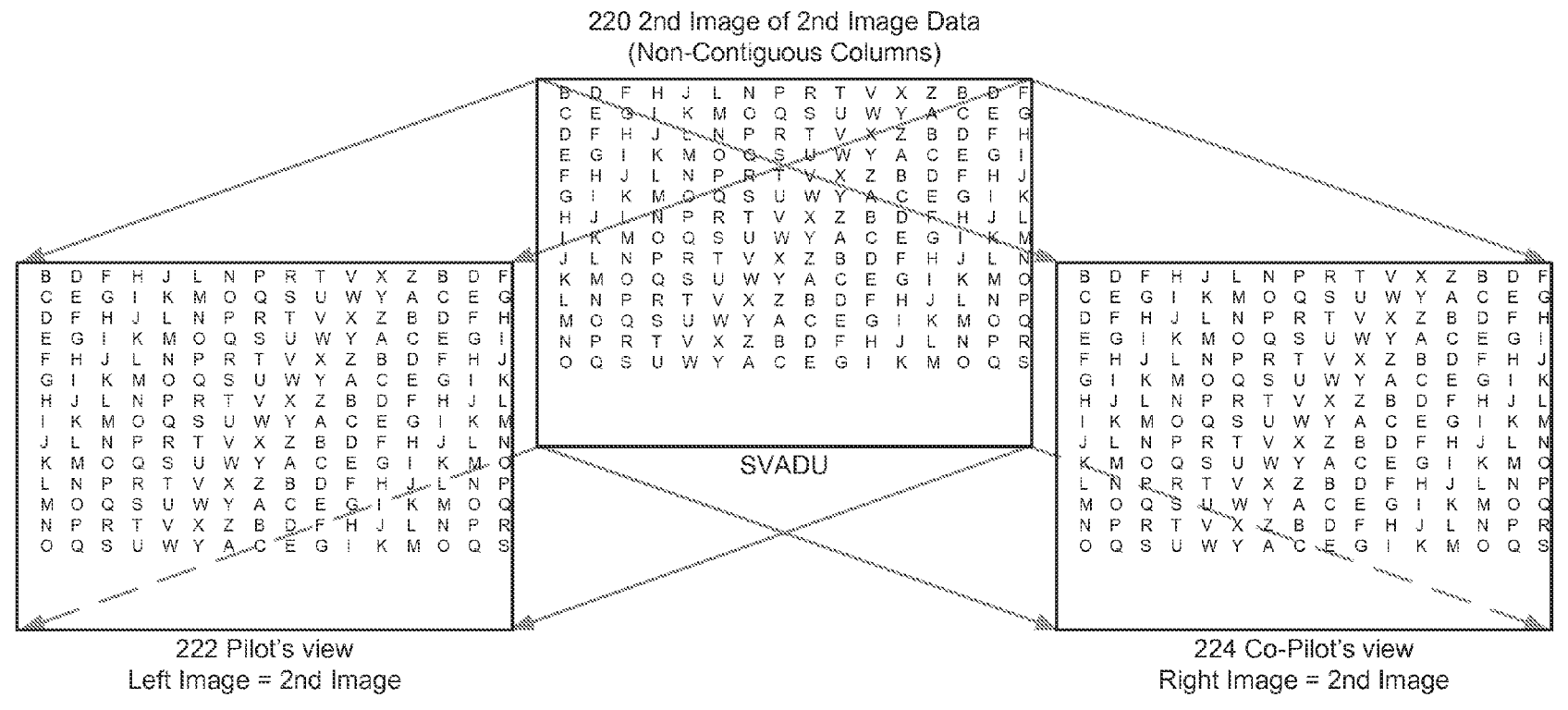

Referring to FIG. 4D, a second image represented in second image data 220 is comprised of non-contiguous pixel columns. As discussed herein, non-contiguous pixel columns of the second image could be comprised of every other pixel column (e.g., even-numbered pixel columns). As shown, the left image of the pilot's view 222 and the right image of the co-pilot's view 224 are the same as the second image represented in second image data 220.

Figure 4E:
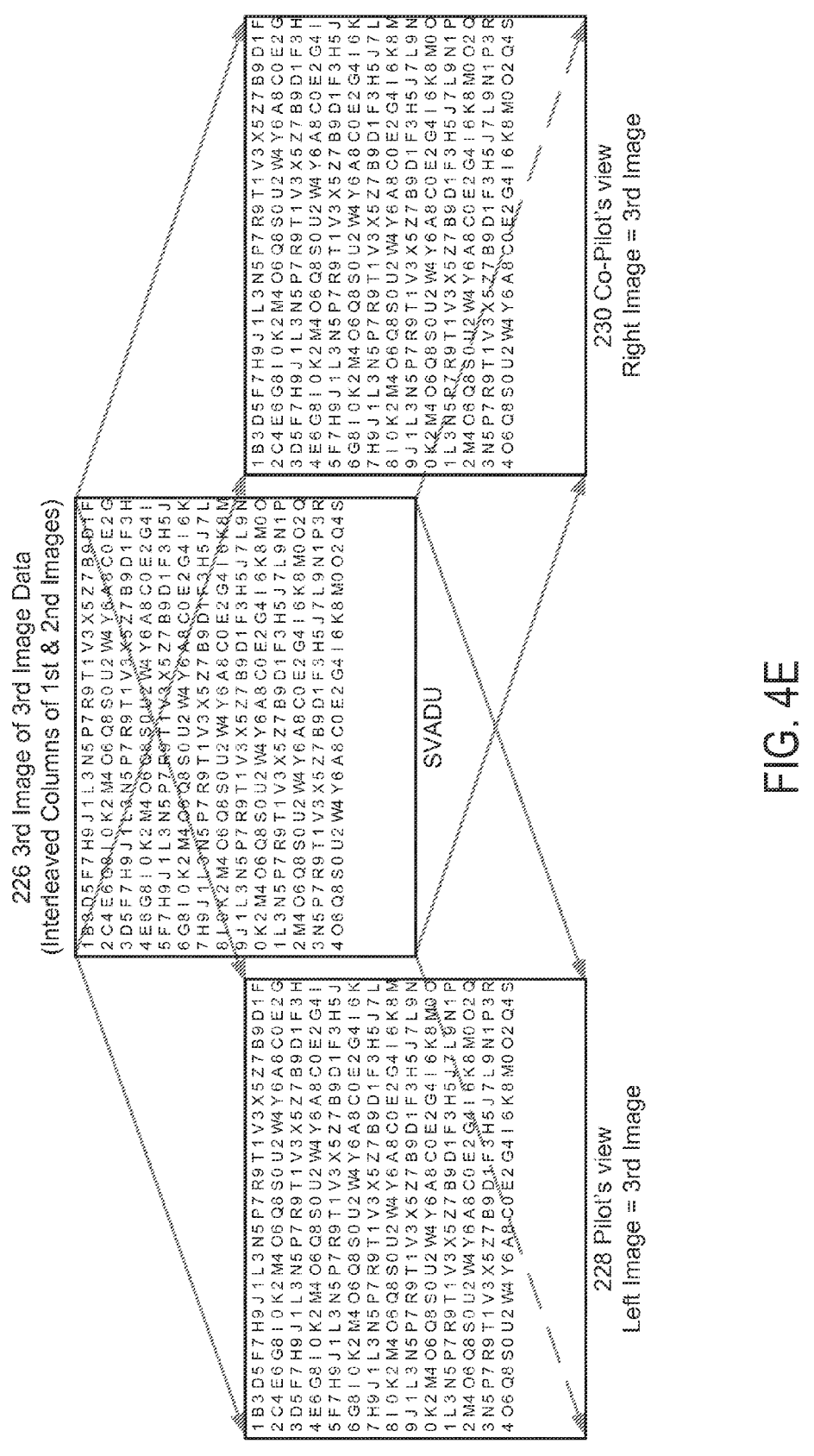

Referring to FIG. 4E, a third image represented in third image data 226 is comprised interleaved pixel columns of the first and second images, where the third image data could have been generated by the IG 120 programmed to merge the first images of FIG. 4A or 4B with the second images of FIG. 4C or 4D. Because the pixel columns of the first and second images have been interleaved, the information that is conveyed separately by the first and second images is not conveyed by the third image when presented on a SVADU (unless the first and second images convey the same information). As shown, the left image of the pilot's view 228 and the right image of the co-pilot's view 230 are the same as the third image; however, unless the information conveyed by the first and second images is the same, it could be difficult or not possible for a viewer understand the information conveyed by the third image.

Figure 5A:
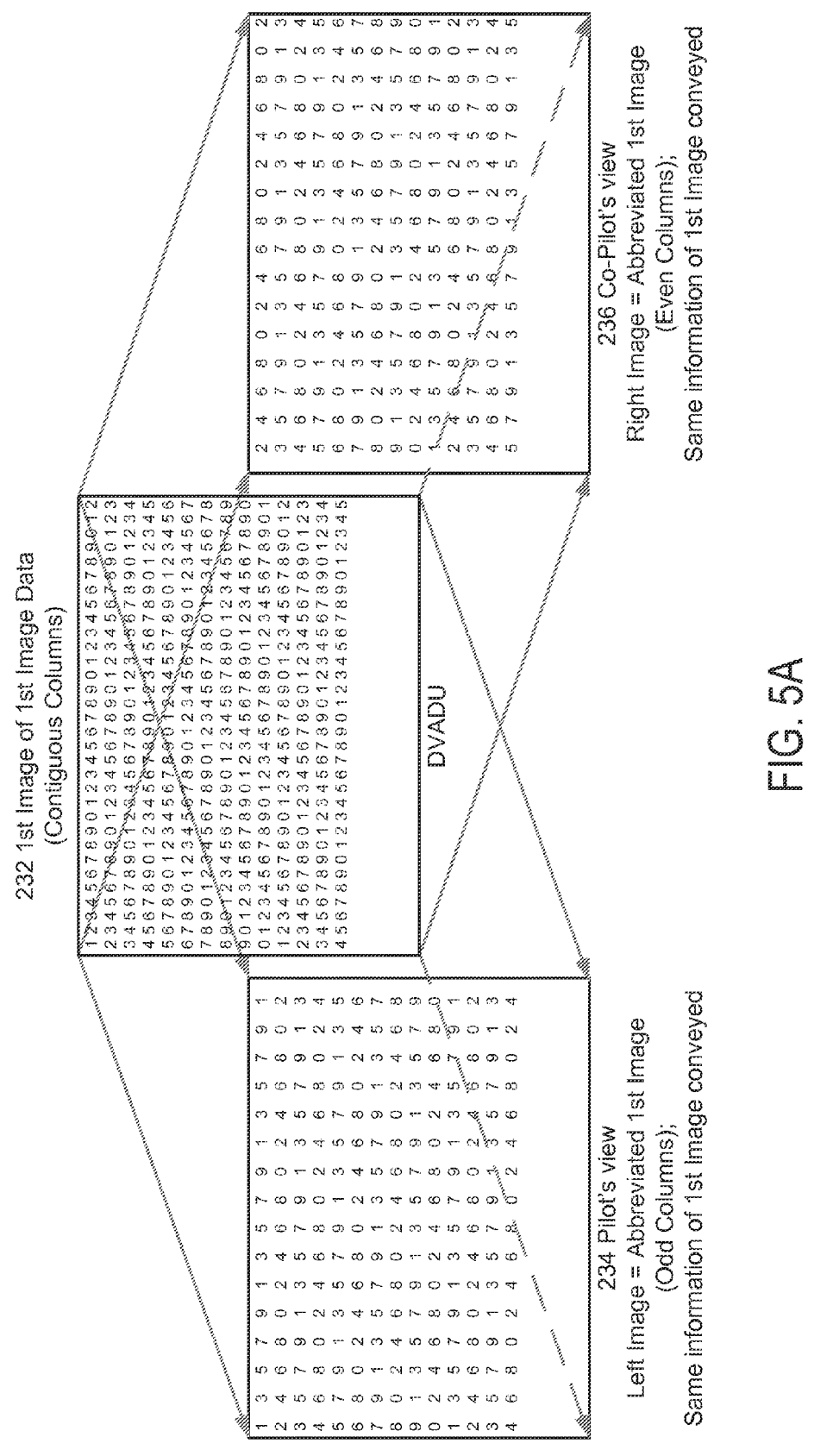
Figure 5B:
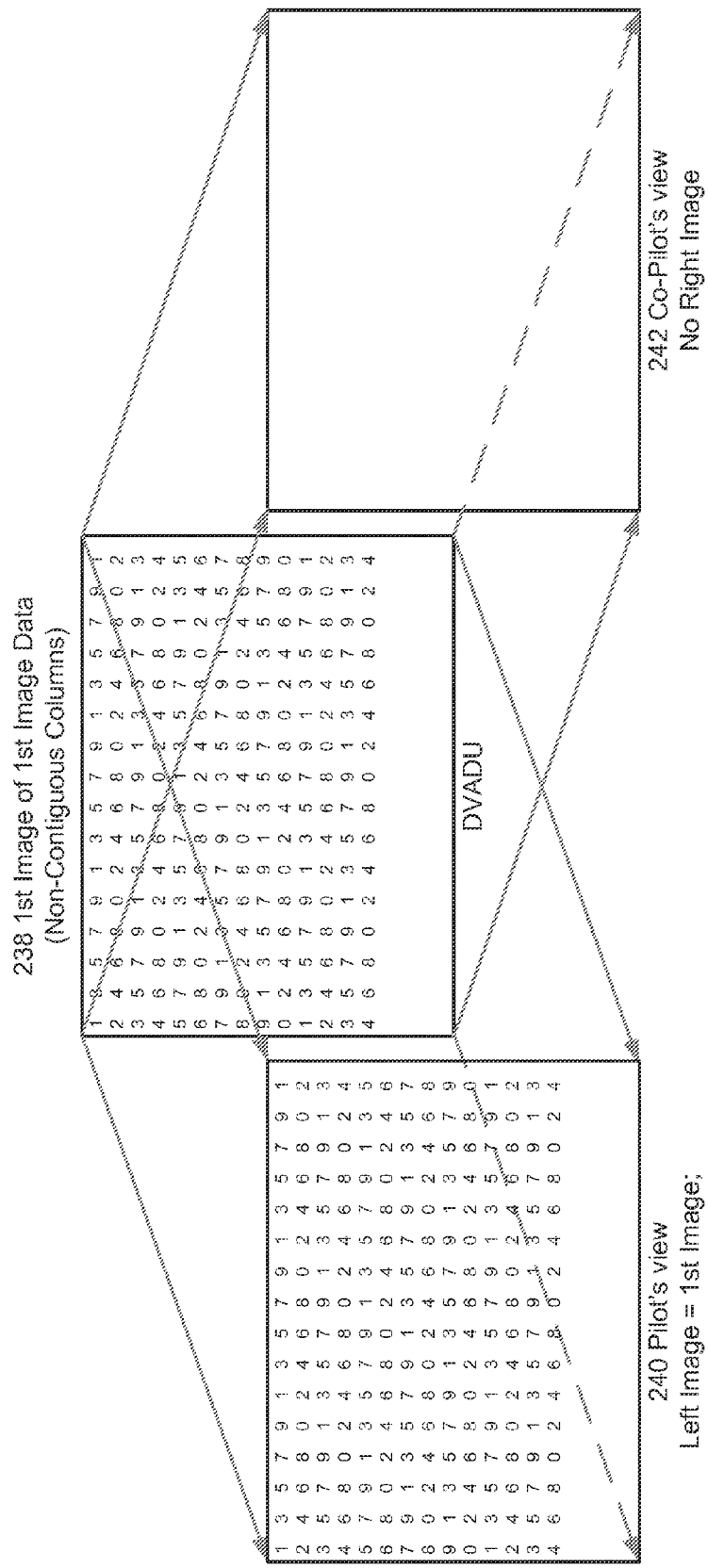
FIG. 5B illustrates the left and right images of a first image comprised of non-contiguous pixel columns presented on a DVADU.

The embodiments of FIGS. 5A through 5E illustrate first and second images presented on a DVADU. As discussed herein, the DVADU is configured to present a left image from odd-numbered pixel columns and a right image from even-numbered pixel columns. Referring to FIG. 5A, a first image represented in first image data 232 is comprised of contiguous pixel columns, where the first image data could have been generated by the first image data source 110-A. The left image of the pilot's view 234 is an abbreviation of the first image comprised of odd-numbered pixel columns, and the right image of the co-pilot's view 236 is an abbreviation of the first image comprised of even-numbered pixel columns. Although the left and right images of FIG. 5A are comprised with fewer pixel columns than the first image, the information conveyed by the first image is nevertheless conveyed by both the left and the right images due to general thinness of pixel columns.

Referring to FIG. 5B, a first image represented in first image data 238 is comprised of non-contiguous pixel columns. The left image of the pilot's view 240 is the first image comprised of odd-numbered pixel columns; however, because the first image is comprised of odd-numbered pixel columns and not even-numbered pixel columns, there is no right image of the co-pilot's view 242.

Figure 5C:
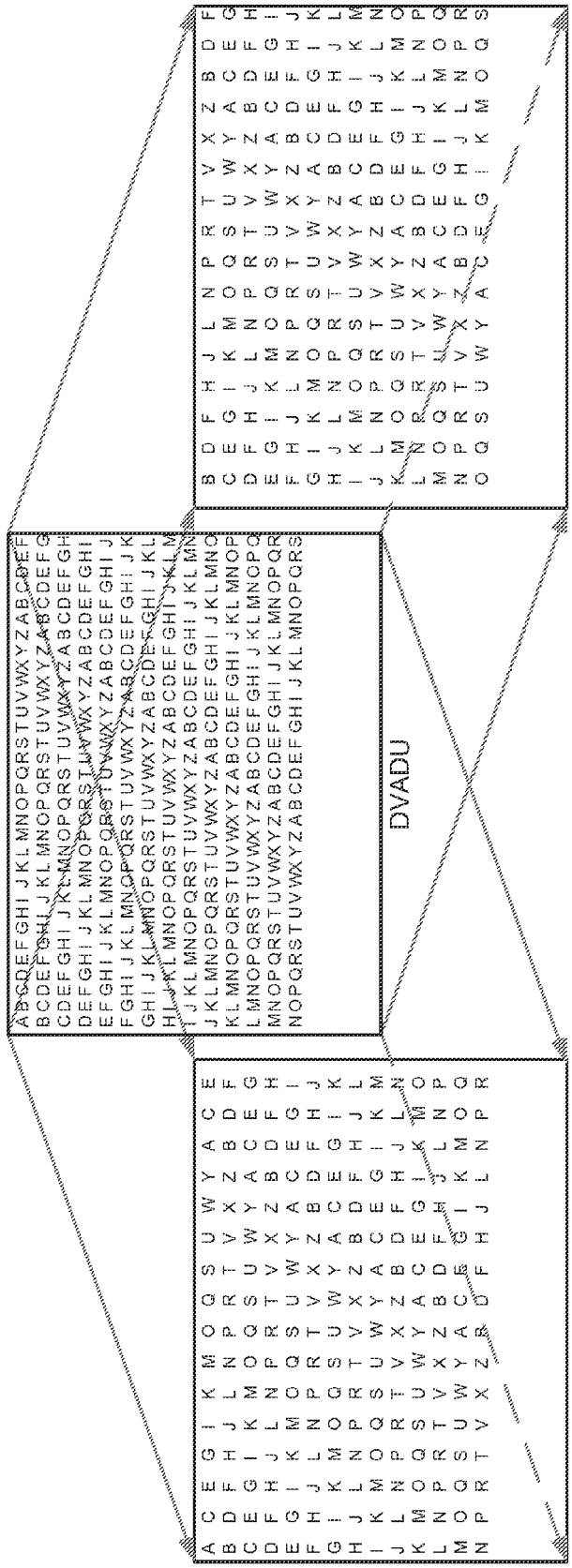
FIG. 5C illustrates the left and right images of a second image comprised of contiguous pixel columns presented on a DVADU.

Referring to FIG. 5C, a second image represented in second image data 244 is comprised of contiguous pixel columns, where the second image data could have been generated by the second image data source 110-B. The left image of the pilot's view 246 is an abbreviation of the second image comprised of odd-numbered pixel columns, and the right image of the co-pilot's view 248 is an abbreviation of the second image comprised of even-numbered pixel columns. Similar to FIG. 5A, the information conveyed by the second image is nevertheless conveyed by both the left and the right images even though the left and right images of FIG. 5C are comprised with fewer pixel columns than the second image.

Figure 5D:
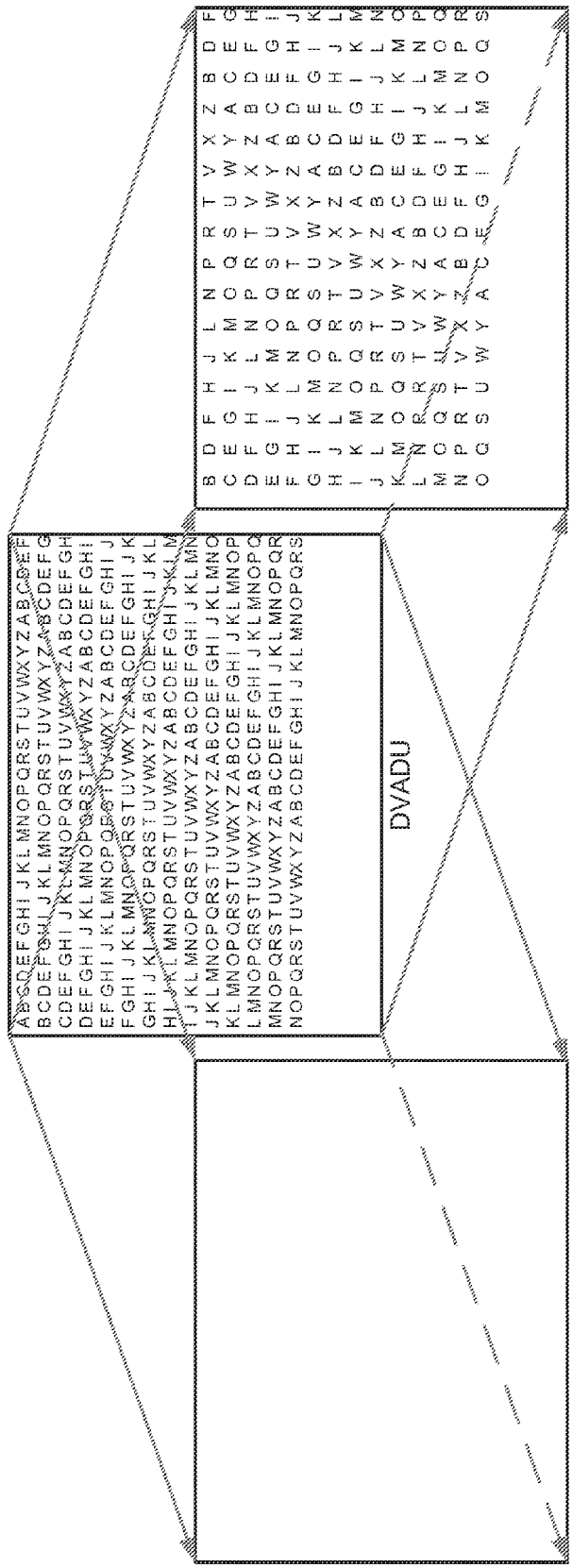
FIG. 5D illustrates the left and right images of a second image comprised of non-contiguous pixel columns presented on a DVADU.

Referring to FIG. 5D, a second image represented in second image data 250 is comprised of non-contiguous pixel columns. The right image of the co-pilot's view 252 is the second image comprised of even-numbered pixel columns; however, because the second image is comprised of even-numbered pixel columns and not odd-numbered pixel columns, there is no left image of the pilot's view 254.

Figure 5E:
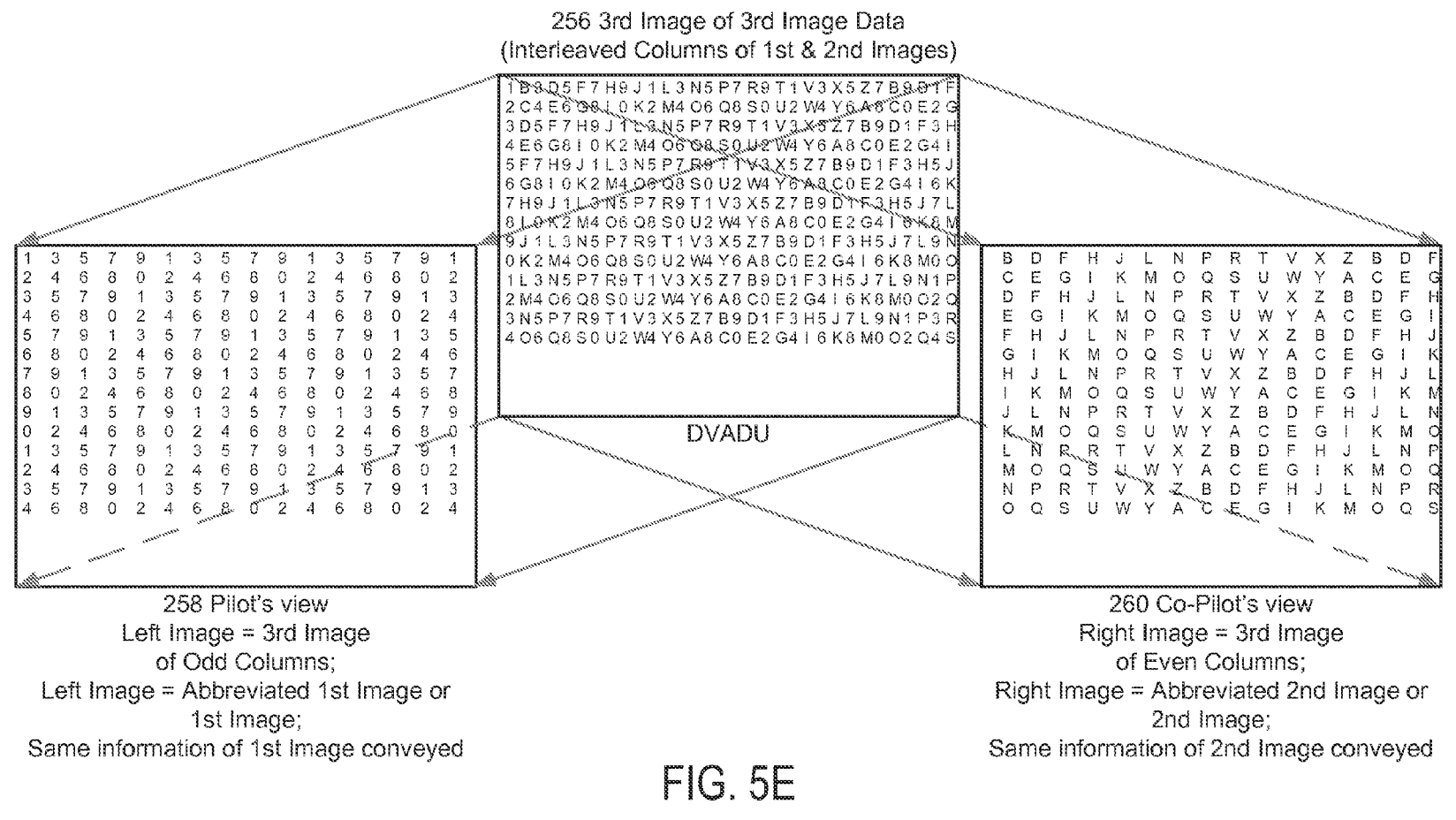

Referring to FIG. 5E, a third image represented in third image data 256 is comprised of interleaved pixel columns of the first and second images, where the third image data could have been generated by the IG 120 programmed to merge the first images of FIG. 5A or 5B with the second images of FIG. 5C or 5D. Although the pixel columns of the first and second images have been interleaved, the information that is conveyed separately by the first and second images is not lost when presented on a DVADU. As shown, the left image of the pilot's view 258 is the same as the third image comprised of odd-numbered pixel columns, and the right image of the co-pilot's view 260 is the same as the third image comprised of even-numbered pixel columns. In addition, the left image of the pilot's view 258 is the same image as the abbreviated first image of FIG. 5A or the first image of FIG. 5B; similarly, the right image of the co-pilot's view 260 is the same image as the abbreviated second image of FIG. 5C or the second image of FIG. 5D. Moreover, the information conveyed by the first image is conveyed by the left image, and the information conveyed by the second image is conveyed by the right image.

Figure 5F:
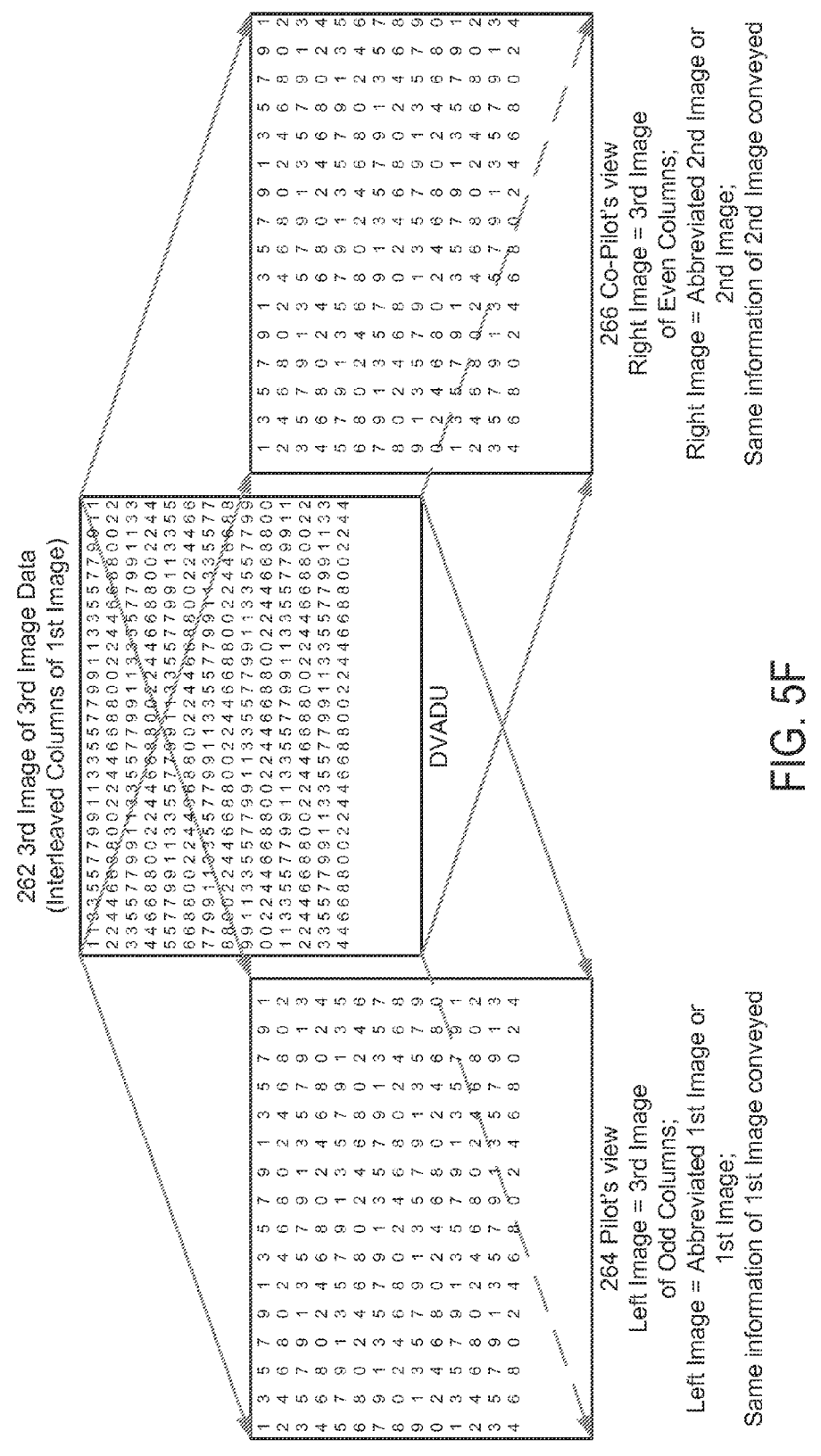

Referring to FIG. 5F, a third image represented in third image data 262 is comprised of interleaved pixel columns of the first image, where the third image data could have been generated by the IG 120 programmed to copy the first image of FIG. 5A or 5B. Although pixel columns of the first image have been interleaved with each other, the information that is conveyed by the first image is not lost when presented on a DVADU. As shown, the left image of the pilot's view 264 is the same as the first image comprised of odd-numbered pixel columns, and the right image of the co-pilot's view 266 is the same as the first image comprised of odd-numbered pixel columns; that is, the right image and the left image are the same image. In addition, the left image of the pilot's view 264 and the right image of the co-pilot's view 266 are the same image as the abbreviated first image of FIG. 5A or the first image of FIG. 5B. Moreover, the information conveyed by the first image is conveyed by both the left image and right images.

Figure 5G:
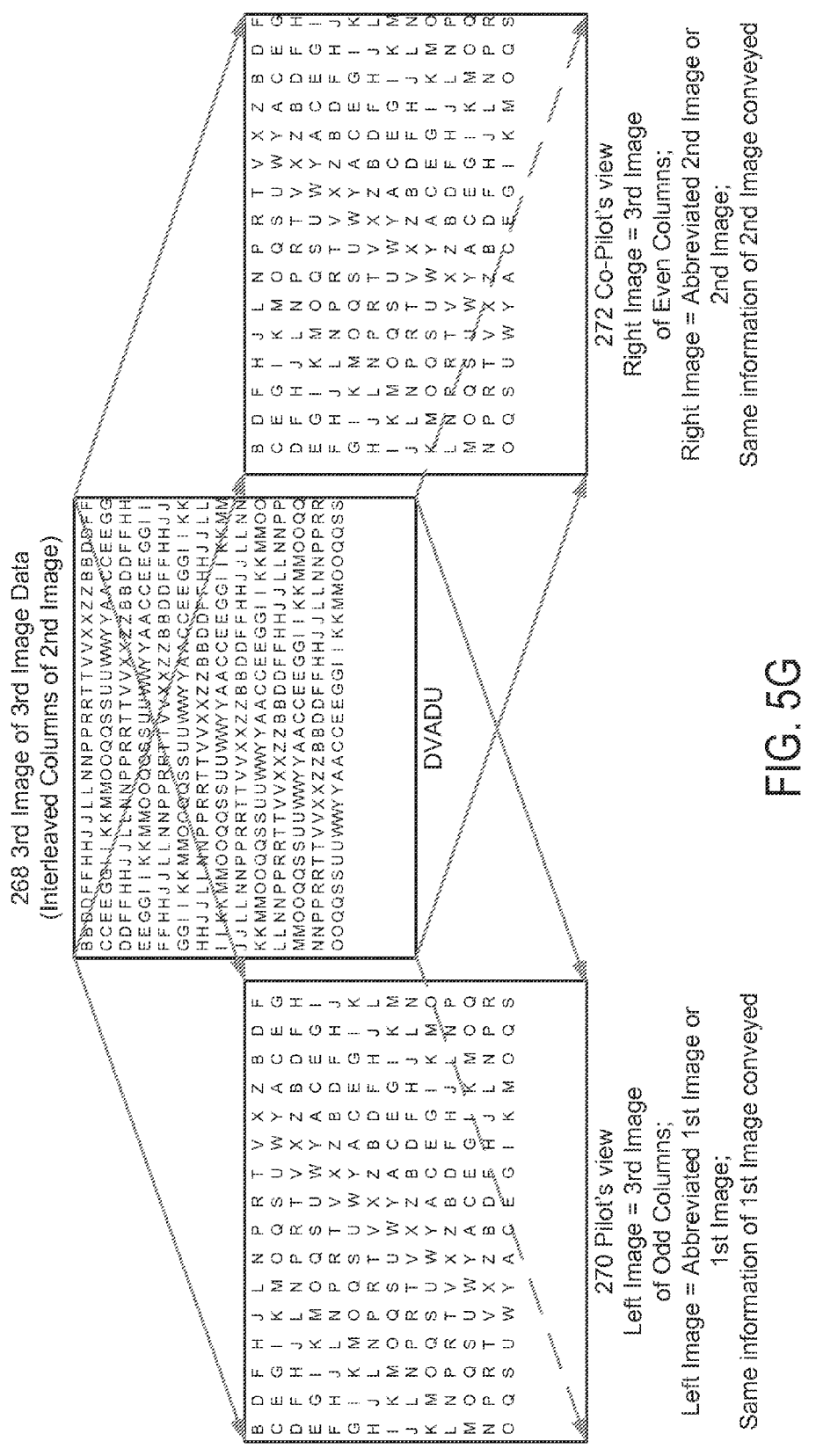

Referring to FIG. 5G, a third image represented in third image data 268 is comprised of interleaved pixel columns of the second image, where the third image data could have been generated by the IG 120 programmed to copy the second image of FIG. 5C or 5D. Although pixel columns of the second image have been interleaved with each other, the information that is conveyed by the second image is not lost when presented on a DVADU. As shown, the left image of the pilot's view 270 is the same as the second image comprised of even-numbered pixel columns, and the right image of the co-pilot's view 272 is the same as the second image comprised of even-numbered pixel columns; that is, the right image and the left image are the same image. In addition, the left image of the pilot's view 270 and the right image of the co-pilot's view 272 are the same image as the abbreviated second image of FIG. 5C or the second image of FIG. 5D. Moreover, the information conveyed by the second image is conveyed by both the left image and right images.

Figure 6:
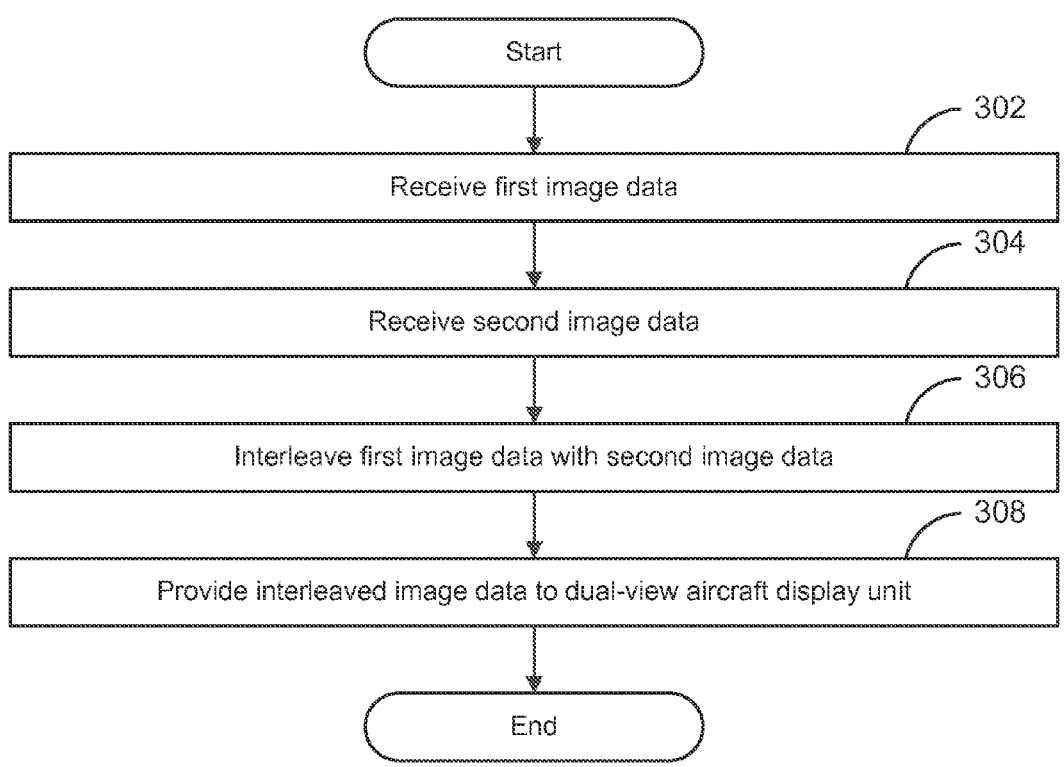
FIG. 6 depicts a flowchart of an example of a method for generating different images to separate viewers of a DVADU.

FIG. 6 depicts flowchart 300 providing a method for generating and presenting on a DVADU separate images for two separately located viewers, where the IG 120 may be programmed or configured with instructions corresponding to the following modules. As embodied herein, the IG 120 may be a processor of a module such as, but not limited to, a printed circuit card having one or more input interfaces to facilitate data communications with the IG 120, i.e., the receiving and providing of data. As necessary for the accomplishment of the following modules embodied in FIG. 6, the receiving of data is synonymous and/or interchangeable with the retrieval of data, and the providing of data is synonymous and/or interchangeable with the making available, supplying, and/or sending of data.

The method of flowchart 300 begins with module 302 with the receiving of first image data from the first image data source 110-A. As embodied herein, the first image data source 110-A may be the IG 120 or an input(s) thereof. The first image data could be representative of a first image comprised of first pixel columns, where the first pixel columns could be comprised of first contiguous or non-contiguous pixel columns. As embodied herein, first contiguous pixel columns could be comprised of first odd-numbered pixel columns and first even-numbered pixel columns, and first non-contiguous pixel columns could be comprised of first odd-numbered pixel columns. The information conveyed by a first image to a viewer is the same regardless of whether the first image is comprised of first contiguous pixel columns or first non-contiguous pixel columns.

The method continues with module 304 with the receiving of second image data from the second image data source 110-B. As embodied herein, the first image data source 110-B may be the IG 120 or an input(s) thereof. The second image data could be representative of a second image, where the second image may be comprised of second contiguous or non-contiguous pixel columns. As embodied herein, second contiguous pixel columns could be comprised of second odd-numbered pixel columns and second even-numbered pixel columns, and second non-contiguous pixel columns could be comprised of second even-numbered pixel columns. The information conveyed by a second image to a viewer is the same regardless of whether the second image is comprised of second contiguous pixel columns or second non-contiguous pixel columns.

The method continues with module 306 with the interleaving of first pixel columns with second pixel columns to generate third image data representative of a third image. In an embodiment in which both the first and second images are comprised of both odd-numbered and even-numbered pixel columns, the interleaving could be accomplished by merging the first odd-numbered pixel columns with the second even-numbered pixel columns and/or excluding the first even-numbered pixel columns and the second odd-numbered pixel columns from being interleaved; that is, the interleaving could be accomplished by merging an abbreviated first image comprised of first odd-numbered pixel columns with an abbreviated second image comprised of second even-numbered pixel columns. When subjected to the DVADU 140, the abbreviated first image becomes the left image conveying the same information as the first image, and the abbreviated second image becomes the right image conveying the same information as the second image.

In an embodiment in which the first image is comprised of first odd-numbered pixel columns and the second image is comprised of second even-numbered pixel columns, the interleaving could be accomplished by merging the first odd-numbered pixel columns with the second even-numbered pixel columns; that is, the interleaving could be accomplished by merging the first image comprised of first odd-numbered pixel columns with the second image comprised of second even-numbered pixel columns. When subjected to the DVADU 140, the first image becomes the left image conveying the information of the first image, and the second image becomes the right image conveying the information of the second image.

In an embodiment in which the first image is comprised of both first odd-numbered pixel columns and first even-numbered pixel columns and the second image is comprised of second even-numbered pixel columns, the interleaving could be accomplished by merging the first odd-numbered pixel columns with the second even-numbered pixel columns and/or excluding the first even-numbered pixel columns from being interleaved; that is, the interleaving could be accomplished by merging an abbreviated first image comprised of first odd-numbered pixel columns with the second image comprised of second even-numbered pixel columns. When subjected to the DVADU 140, the abbreviated first image becomes the left image conveying the same information as the first image, and the second image becomes the right image conveying the information of the second image.

In an embodiment in which the first image is comprised of first odd-numbered pixel columns and the second image is comprised of both second odd-numbered pixel columns and second even-numbered pixel columns, the interleaving could be accomplished by merging the first odd-numbered pixel columns with the second even-numbered pixel columns and/or excluding the second odd-numbered pixel columns from being interleaved; that is, the interleaving could be accomplished by merging the first image comprised of first odd-numbered pixel columns with an abbreviated second image comprised of second even-numbered pixel columns. When subjected to the DVADU 140, the first image becomes the left image conveying the information of the first image, and the abbreviated second image becomes the right image conveying the same information as the second image.

In an additional embodiment, the left image or right image may be shared between the left viewer and the right viewer; that is, the left image and the right image represented in the third image data could be the same image. If so, a source of image selection data such as the DVC 130 could receive input from the left viewer or the right viewer seeking to share his or her image with the other. Then, the IG 120 could receive image sharing selection data representative of a selection to provide the right viewer with the left image or the left viewer with the right image from the source. When received, the IG 120 could modify the third image data. In response to an image sharing selection to provide the right viewer with the left image, the second pixel columns of the second image comprising the third image data could be replaced with the first pixel columns of the first image comprising the third image data. In response to an image sharing selection to provide the left viewer with the right image, the first pixel columns of the first image comprising the third image data could be replaced with the second pixel columns of the second image comprising the third image data.

In an additional embodiment, the left viewer and/or the right viewer could change the left and/or the right images, respectively, through a selection made via the use of a viewer input device; such selection(s) could be made separately or simultaneously. When a selection to change image(s) is made, the DVC 130 could receive first selection data representative of a selection of the left viewer and/or second selection data representative of a selection of the right viewer. Then, the DVC 130 could generate third selection data and/or fourth selection data in response to the first selection data and/or second selection data, respectively. Then, the DVC 130 could provide the third selection data and/or the fourth selection to the image data source 110-A and/or the image data source 110-B, respectively. If third selection data is provided, the image data source 110-A could be further configured to change the first image data in response to the third selection data; if fourth selection data is provided, the image data source 110-B could be further configured to change the second image data in response to the fourth selection data.

The method continues with module 308 with the providing of the third image data to the DVADU 140 configured to receive the third image data and present the third image represented therein on the DVADU 140. When presented, the information conveyed by the left image to a viewer located to the left of the on the DVADU 140 includes the information conveyed by the first image but excludes the information conveyed by the second image, and the information conveyed by the right image to a viewer located to the right of the on the DVADU 140 includes the information conveyed by the second image but excludes the information conveyed by the first image. Then, the flowchart proceeds to the end.

It should be noted that the methods described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating different images to separate viewers of a dual-view aircraft electronic display unit, such system comprising:
    a first source configured to generate first image data;
    a second source configured to generate second image data;
    an image generator configured to
        receive first image data from the first source, where
            the first image data is representative of a first image generated as a function of a first image configuration and comprised of first pixel columns,
        receive second image data from the second source, where
            the second image data is representative of a second image generated as a function of a second image configuration and comprised of second pixel columns,
        generate third image data from the first image data and the second image data, where
            the third image data is
                representative of a left image and a right image forming an interleaved image, and
                comprised of first pixel columns of the first image interleaved with second pixel columns of the second image, and
        provide the third image data to a dual-view aircraft electronic display unit; and
    the dual-view aircraft electronic display unit configured to
        receive the third image data,
        divide the interleaved image into the left image and the right image, and
        present the left image and the right image to a left viewer and to a right viewer, respectively.

2. The system of claim 1, wherein the image generator is the first source of image data, the second source of image data, or both.

3. The system of claim 1, wherein
    the first pixel columns are comprised of first contiguous pixel columns,
    the second pixel columns are comprised of second contiguous pixel columns,
    the left image is an abbreviated first image, and
    the right image is an abbreviated second image.

4. The system of claim 1, wherein
    the first pixel columns are comprised of first non-contiguous pixel columns,
    the second pixel columns are comprised of second non-contiguous pixel columns,
    the left image is the first image, and
    the right image is the second image.

5. The system of claim 1, wherein
    the first pixel columns are comprised of first contiguous pixel columns,
    the second pixel columns are comprised of second non-contiguous pixel columns,
    the left image is an abbreviated first image, and
    the right image is the second image.

6. The system of claim 1, wherein
    the first pixel columns are comprised of first non-contiguous pixel columns,
    the second pixel columns are comprised of second contiguous pixel columns,
    the left image is the first image, and
    the right image is an abbreviated second image.

7. The system of claim 1, wherein the dual-view aircraft electronic display unit is a liquid crystal display employing a light-passing mask that divides the interleaved image into the left image and the right image.

8. The system of claim 1, wherein the dual-view aircraft electronic display unit is comprised of an array of microlenses that divides the interleaved image into the left image and the right image.

9. The system of claim 1, further comprising:
a source of image sharing selection data; and
the image generator is further configured to
receive image sharing selection data representative of a selection to provide the right viewer with the left image or the left viewer with the right image, and
modify the third image data, where
the second pixel columns of the second image comprising the third image data are replaced with the first pixel columns of the first image comprising the third image data in response to the image sharing selection to provide the right viewer with the left image, or
the first pixel columns of the first image comprising the third image data are replaced with the second pixel columns of the second image comprising the third image data in response to the image sharing selection to provide the left viewer with the right image, such that
the left image and the right image represented in the third image data are the same image.

10. The system of claim 1, further comprising:
a dual-view controller configured to
receive first selection data representative of a selection of the left viewer or second selection data representative of a selection of the right viewer,
generate third selection data or fourth selection data in response to the first selection data or second selection data, respectively, and
provide the third selection data or the fourth selection to the first source or the second source, respectively; and
the first source further configured to
receive the third selection data, and
change the first image data in response to the third selection data; and
the second source further configured to
receive the fourth selection data, and
change the second image data in response to the fourth selection data.

11. The system of claim 10, wherein the selections of the left viewer and the right viewer are made simultaneously.

12. A device used for presenting different images to separate viewers of a dual-view aircraft electronic display unit, such device comprising:
an image generator configured to
receive first image data from a first source, where
the first image data is representative of a first image generated as a function of a first image configuration and comprised of first pixel columns,
receive second image data from a second source, where
the second image data is representative of a second image generated as a function of a second image configuration and comprised of second pixel columns,
generate third image data from the first image data and the second image data, where
the third image data is
representative of a left image and a right image forming an interleaved image, and
comprised of first pixel columns of the first image interleaved with second pixel columns of the second image, and
provide the third image data to a dual-view aircraft electronic display unit configured to divide the interleaved image into the left image and the right image, whereby
the interleaved image is divided into the left image and the right image, and
the left image and right image are presented to a left viewer and a right viewer, respectively.

13. The device of claim 12, wherein
the first pixel columns are comprised of first contiguous pixel columns,
the second pixel columns are comprised of second contiguous pixel columns,
the left image is an abbreviated first image, and
the right image is an abbreviated second image.

14. The device of claim 12, wherein
the first pixel columns are comprised of first non-contiguous pixel columns,
the second pixel columns are comprised of second non-contiguous pixel columns,
the left image is the first image, and
the right image is the second image.

15. The device of claim 12, wherein
the first pixel columns are comprised of first contiguous pixel columns,
the second pixel columns are comprised of second non-contiguous pixel columns,
the left image is an abbreviated first image, and
the right image is the second image.

16. The device of claim 12, wherein
the first pixel columns are comprised of first non-contiguous pixel columns,
the second pixel columns are comprised of second contiguous pixel columns,
the left image is the first image, and
the right image is an abbreviated second image.

17. The device of claim 12, wherein
the image generator is further configured to
receive image sharing selection data representative of a selection to provide the right viewer with the left image or the left viewer with the right image, and
modify the third image data, where
the second pixel columns of the second image comprising the third image data are replaced with the first pixel columns of the first image comprising the third image data in response to the image sharing selection for providing the right viewer with the left image, or
the first pixel columns of the first image comprising the third image data are replaced with the second pixel columns of the second image comprising the third image data in response to the image sharing selection for providing the left viewer with the right image, such that
the left image and the right image represented in the third image data are the same image.

18. A method for generating different images to separate viewers of a dual-view aircraft electronic display unit, such method comprising:
receiving first image data, where
the first image data is representative of a first image generated as a function of a first image configuration and comprised of first pixel columns;

receiving second image data, where
  the second image data is representative of a second image generated as a function of a second image configuration and comprised of second pixel columns;
generating third image data from the first image data and the second image data, where
  the third image data is
    representative of a left image and a right image forming an interleaved image, and
    comprised of first pixel columns of the first image interleaved with second pixel columns of the second image; and
providing the third image data to a dual-view aircraft electronic display unit configured to divide the interleaved image into the left image and the right image, whereby the left image and right image are presentable to a left viewer and a right viewer, respectively.

19. The method of claim 18, wherein
the first pixel columns are comprised of first contiguous pixel columns,
the second pixel columns are comprised of second contiguous pixel columns,
the left image is an abbreviated first image, and
the right image is an abbreviated second image.

20. The method of claim 18, wherein
the first pixel columns are comprised of first non-contiguous pixel columns,
the second pixel columns are comprised of second non-contiguous pixel columns,
the left image is the first image, and
the right image is the second image.

21. The method of claim 18, wherein
the first pixel columns are comprised of first contiguous pixel columns,
the second pixel columns are comprised of second non-contiguous pixel columns,
the left image is an abbreviated first image, and
the right image is the second image.

22. The method of claim 18, wherein
the first pixel columns are comprised of first non-contiguous pixel columns,
the second pixel columns are comprised of second contiguous pixel columns,
the left image is the first image, and
the right image is an abbreviated second image.

23. The method of claim 18, further comprising:
receiving image sharing selection data representative of a selection to provide the right viewer with the left image or the left viewer with the right image, and
modifying the third image data, where
  the second pixel columns of the second image comprising the third image data are replaced with the first pixel columns of the first image comprising the third image data in response to the image sharing selection for providing the right viewer with the left image, or
  the first pixel columns of the first image comprising the third image data are replaced with the second pixel columns of the second image comprising the third image data in response to the image sharing selection for providing the left viewer with the right image, such that
  the left image and the right image represented in the third image data are the same image.

* * * * *